United States Patent Office 2,855,944
Patented Oct. 14, 1958

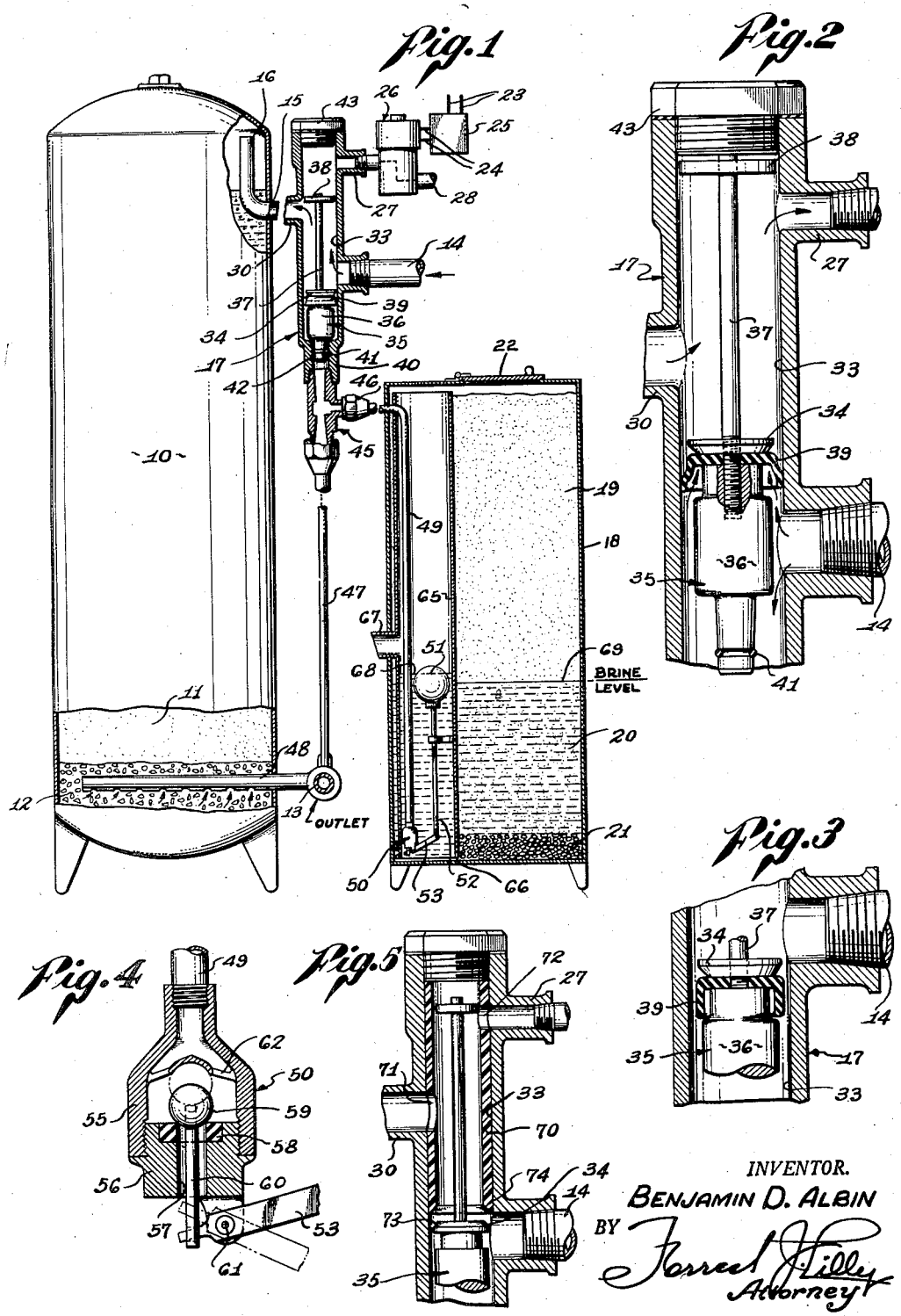

2,855,944

CONTROL VALVE FOR AUTOMATIC
REGENERATION SYSTEM

Benjamin D. Albin, Hermosa Beach, Calif., assignor to Fraser and Albin, Los Angeles, Calif., a partnership Original application October 9, 1950, Serial No. 189,228. Divided and this application December 3, 1953, Serial No. 395,971

6 Claims. (Cl. 137—102)

My invention relates generally to valves and more particularly to a multiple port control valve and actuating means therefor particularly useful in water softener and regeneration systems.

This application is a division of my copending application Serial No. 189,228, filed October 9, 1950, now abandoned, entitled "Water Softener and Regeneration System."

The process of softening hard water by passing it through a zeolite bed is well known. Certain constituents of calcium in the hard water are replaced, generally by sodium, from the zeolite bed to effect the softening.

After a certain amount of the calcium has been replaced in the manner above-described, the zeolite material loses its effectiveness and must be regenerated. Such regeneration is accomplished by flushing a solution of sodium chloride through the zeolite bed. For maximum effectiveness, the regenerative brine or salt solution should be passed through the zeolite in a reverse direction as compared with that of the water under treatment, thus to effect a mechanical cleansing of the zeolite bed as well as the regeneration thereof, and also causing a slight agitation or boiling of the zeolite fragments to promote thorough and intimate contact of the regenerative brine therewith. Also it will be realized that after regeneration it is necessary to flush the zeolite bed with fresh water in order to remove all traces of brine therefrom which would contaminate the water thereafter.

The present invention deals primarily with the control of fluid flow for the various regeneration and flushing cycles in a water softener and regeneration system of the above nature and has as its primary object the provision of a multiple port control valve for this purpose.

Another object of the invention is to provide such a control valve which is operated in part by the pressure of fluid passing through the valve.

A still further object of the invention is to provide a control valve for an automatic regenerating system of the class described which is relatively simple and incorporates few mechanical parts, whereby to be inexpensive to manufacture.

Yet another object of the invention is to provide a valve of the type just described which is easy to disassemble for the replacement of expendible parts such as gaskets and the like.

The foregoing and additional objects and advantages of the invention will be apparent from consideration of the following detailed description of a system embodying the same, such consideration being given likewise to the attached drawing in which:

Fig. 1 is a partially enlarged, partially sectioned, elevational view of a water softener system embodying the present invention;

Fig. 2 is an enlarged elevational section of a flushing valve portion of the system shown in Fig. 1, showing an alternate operative position thereof;

Fig. 3 is a section similar to Fig. 2 showing an alternate operative position of valve member therein;

Fig. 4 is an enlarged elevational section of a float valve forming a part of the system illustrated in Fig. 1; and Fig. 5 is an elevational section similar to Fig. 2 but illustrating an alternative form of the flushing valve construction.

The water softening plant shown herein as illustrative of the use of the valve of the invention is of the type generally used in small to medium-sized residences.

In the drawing I have designated a more or less conventional water softener tank by the reference character 10. The tank 10 contains a bed of zeolite 11 and in some cases may be provided with a relatively shallow bottom layer 12 of gravel or coarse sand which performs the function of a conventional mechanical filter. During the process, untreated water or "raw" water as it will be termed herein, normally enters the tank 10 by an inlet 15 near the top and passes down through the bed 11 and thence to an outlet 13. The outlet 13 is connected in the usual fashion to the house service line or other supply line through which soft or treated water is to be supplied.

A short internal standpipe 16 is connected to the inlet 15 whereby to prevent zeolite fragments from being flushed out of the tank during the regeneration cycle hereinafter to be described. Raw water is supplied to the softener tank 10 from a supply pipe 14 through a flushing valve 17 which will be described in more detail hereinafter. The scale of the valve 17 is exaggerated as compared with the balance.

Dry rock salt 19 for the production of regenerative brine 20 is stored in a brine tank 18 formed with a suitably closed supply aperture 22 at the top.

In normal usage the zeolite bed 11 need be regenerated only after a considerable period of use. In the normal household installation in areas where relatively "hard" water is encountered one regenerative cycle every several days is almost always sufficient. In the present case the timing of the regenerative cycle is accomplished by an electric control clock 25 of conventional design which is supplied with electric power by conductors 23 and adapted to periodically close the circuit including conductors 24 and a conventional normally closed solenoid valve 26. The cycle is so timed that regeneration occurs during a period when the demand is at a minimum, e. g., the early morning hours. When the control circuit of the clock 25 is closed, the solenoid valve 26 is opened, intercommunicating a drain connection 27 of the flush valve 17 and a drainpipe 28 of the solenoid valve 26. Thus when the solenoid valve 26 is opened fluid may escape from a central bore in the valve 17 through the drain connection 27.

The flush valve 17 of the present invention includes a body axially bored at 33 and having a lateral connection to receive the intake supply line 14, an outlet connection to communicate the valve 17 with the tank inlet 15, and the drain connection 27. The upper end of the bore 33 is closed by a plug 43 and a water jet ejector pump 45 is fluid connected to the axial bore 33 at the lower end thereof.

Loosely fitting within the bore 33 is a plunger assembly 35 comprising a lower weight portion 36, an axial stem 37 and an upper piston 38. Intermediate the ends of the plunger assembly 35 is a flexible cup 39 of rubber-like material coaxially secured between the weight 36 and a washer member 34, the cup 39 being disposed with its lip downward and secured by the threaded interconnection of the stem 37 and the weight 36. In its normal unstressed condition (Fig. 3), the cup 39 is spaced from the interior wall of the bore 33 so as to permit the free passage of water around the cup 39 and also to permit free axial movement of the plunger assembly 35 in the bore.

The bore 33 is reduced in diameter and tapered adjacent the lower end of the body whereby to form a valve seat 42. A lower projection on the weight 36 which is peripherally grooved to receive a sealing O-ring 41 serves to engage the seat 42 and close the lower end of the bore 33 when the plunger assembly is in its normal or lowermost postion (Fig. 1).

The jet pump 45 is of known design having a conventional lateral intake or suction connection 46 connected to a tube 49 leading to the lower end of an internal well 65 in the brine tank 18. The tube 49 serves the dual purpose of withdrawing brine from the tank 18 during the regenerative cycle, and replenishing the brine tank with water after the regenerative cycle is completed.

Connected to the lower end of the brine tube 49 is a foot valve 50 the function of which is to terminate the flow of water to the brine tank when a sufficient supply has been replaced therein. To this end a float 51 connected by a vertical stem 52 and a pivoted lever 53 serves to operate the foot valve 50.

The internal construction of foot valve 50 is best seen in Fig. 4. Here it can be seen that the valve 50 includes an upper body portion 55 internally threaded at the lower end to receive a lower body portion 56 and at the upper end to receive the brine tube 49.

An axial bore 57 is formed in the lower body portion 56 and an annular valve seat 58 is carried in the body portion 56 adjacent the upper end of the bore 57. A check valve ball 59 is loosely positioned within an internal cavity in the body portion 55 and normally rests on the seat 58 to close the bore 57. The ball may be lifted from the seat 58 however by an upwardly thrusting stem 60 loosely positioned in the bore 57. Upward movement of the ball 59 is limited by an internal spider 62. The lower end of the valve lifting stem 60 is loosely and pivotally connected to the lever 53 which in turn is pivotally attached to the lower body portion 56 by a transverse pivot pin 61.

Thus it will be seen that when water is withdrawn from the well 65 and buoyant support is removed from the float 51, the latter drops and due to its pivotal connection through the lever 53 thrusts upwardly on the lifting stem 60. Thus until water reaches the level indicated by the reference character 68 within the well 65 the ball 59 in the foot valve 50 is held away from the seat 58. As soon as water reaches the level 68 however the float is lifted, the stem 60 is dropped, and the ball 59 is permitted to seat against the valve seat 58 closing the bore 57.

The details of construction having been described the operation of the system will now be described as follows. During the normal condition of the system, that is the condition in which raw water passes from the supply pipe 14 through the valve 17 and into the tank 10 for treatment, the plunger assembly 35 is in its lowermost position (Fig. 1) thus closing the lower end of the bore 33 and permitting free passage of raw water through the valve 17 to the upper tank inlet 15. During this normal condition, the solenoid valve 26 is closed as previously stated.

When the time for regeneration arrives, the clock 25 supplies power through the connection 24 to the solenoid valve 26 opening the same and permitting the fluid in the flush valve 17 under normal line pressure to escape through the drain connection 27, the valve 26, and the drain pipe 28. It will be realized that at the time of the regeneration cycle the demand through the house service connection 13 will be substantially zero and thus the back pressure in the tank 10 will be substantially equal to the line pressure in the supply pipe 14. Thus the escape of water from the upper end of the bore 33 through the drain connection 27 will cause a substantial upward axial flow through the bore. The piston 38 while a loose enough fit in the bore 33 to prevent frictional resistance to axial movement of the plunger assembly 35 is a close enough fit therein so that the internal bore is materially blocked. Thus the line pressure in the supply pipe 14 produces a substantial upward force on the plunger assembly 35 which is sufficient to unseat the sealing ring 41 from the valve seat 42 and lift the entire plunger assembly 35 upwardly until the upper end of the stem 37 strikes the underside of the top plug 43. In this upper limiting position (Fig. 2) the piston 38 has passed beyond the drain connection 27 thus permitting free flow of fluid from the lateral connection 30 axially through the valve and out the drain connection 27.

The upward movement of the plunger assembly 35 also carries the valving cup 39 past the lateral connection to the supply pipe 14 and the cup 39 being of a flexible resilient material is expanded outwardly into contact with the wall of the bore 33 thus to block the same to upward flow of fluid from the supply pipe 14.

With the plunger assembly 35 in its uppermost position (Fig. 2) the valve 41—42 is open and thus raw water from the supply pipe 14 may pass downwardly through the valve 17, the jet pump 45, the conduit 47, and enter the lower end of the tank 10 through an internal distribution pipe 48. The raw water then circulates upwardly through the gravel bed 12, the zeolite 11, agitating the latter and escapes from the upper end of the tank 10 through the internal standpipe 16, the normal intake connection 15, the valve body 33, the solenoid 26 and the drain pipe 28. The counterflow of water through the bed 11 acts to mechanically clean the tank as well as to regenerate the same as will be hereinafter described.

The action of the jet pump 45 is such as to create suction in the brine tube 49 thus opening the check valve 58—59 and withdraw the contents of the tank well 65.

In order to intercommunicate the tank well with the brine tank 18 the well is spaced above the bottom of the tank as indicated by the reference character 66. A shallow layer of filter gravel 21 in the bottom of the brine tank 18 appears to prevent any substantial crystals of rock salt 19 from being drawn into the well 65. The saturated brine 20 is however drawn into the brine tube 49 and mixed with the raw flushing water in the jet pump 45. Thus the zeolite 11 is flushed with a brine solution during the first part of the regeneration cycle, that is until the brine 20 is all drawn out of the brine tank 18. After the brine tank is emptied of brine the flushing cycle continues for a long enough period to flush fresh water through the zeolite 11 in sufficient quantity to substantially remove all traces of brine therefrom. The total length of the regenerative cycle, including the flushing period just referred to, is adjusted by the timing of a control clock 25.

When the full regenerative period has elapsed the circuit to the solenoid valve 26 is broken by operation of the clock 25 allowing the latter to close and preventing further escape of fluid through the drain pipe 28. Such blocking of the escape passageway terminates the upward force operating on the plunger assembly 35 which then falls of its own weight reseating the O-rings 41 against the valve seat 42. This terminates further counterflow through the tank 10 and re-establishes the communication from the supply pipe 14 through the valve 17 into the top of the tank at the connection 15.

When the normal condition of operation is resumed that is with the valves 41—42 closed, the jet pump 45 no longer operates and the back pressure through the conduit 47 permits water (from the connection 13) to flow back through the brine tube 49 and discharge at the bottom of the well 65. When sufficient water has been supplied to the brine tank to raise the level to the point indicated by the reference character 69, the float mechanism 51—52—53—60 is operated to release the ball 59 and permit the same to seat against the internal seat 58, thus closing the foot valve 50.

An alternate form of the flush valve 17 is illustrated in Fig. 5. In its alternate form the cup 39 is removed from the plunger assembly 35 and an internal bore reducing liner sleeve 70 of a malleable plastic material is placed in the valve body above the inlet port. The sleeve 70 is a relatively close fit in the bore of the body 33 and is provided with openings 71 and 72 adjacent the lateral fluid connections 30 and 27 respectively. The washer 34 which previously served to retain the cup 39 in place in the plunger assembly 35 is inverted and chamfered at its upper edge as indicated by the reference character 73 to form a valving or sealing member. The lower end of the sleeve 70 is internally chamfered as shown at 74 to receive the washer 34 when the plunger assembly moves upwardly in the bore 33. Thus at the upper limit of its movement the plunger assembly 35 effects a closure of the bore to prevent upward passage of water from the supply pipe 14. This same result can be achieved by simply increasing the diameter of the bore 33 at its lower end to provide an annular shoulder equivalent to the chamfered shoulder at 74. In this event however, it is desirable to employ the cup type closure 39 shown in Fig. 2, the peripheral lip of the cup engaging the chamfered shoulder. Such an arrangement permits easy disassembly of the valve by permitting the whole plunger to be withdrawn from the top upon removal of the cap 43, the cup lips collapsing to pass the shouldered portion. In the embodiment of Fig. 5 disassembly of the valve is accomplished by first removing the internal sleeve 70. The provision of an increased diameter at the lower portion of the bore 33 insures that the cup lip, on its downward stroke, will not catch on the edge opening of the port connecting conduit 14.

A still further modification of the device consists in forming the chamfered valving surface 73 directly in the weight portion 36 of the plunger assembly 35.

While the forms shown and described herein are fully capable of achieving the objects and providing the advantages hereinbefore stated, it will be realized that they are capable of further modification without departure from the spirit of the invention. For this reason I do not mean to be limited to the forms shown and described, but rather to the scope of the appended claims.

I claim:

1. An automatic flushing valve for liquid treatment plants, comprising in combination: a valve body having an inlet connection, a normal outlet connection, a flushing outlet connection and a drain connection; and valve means in said body movable therein between a normal position and a flushing position, said valve means including a member to close said flushing connection and being adapted to permit intercommunication of said inlet connection and said normal outlet connection when said valve means is in normal position and including a second member to block flow from said inlet connection to said normal outlet connection and being adapted to permit intercommunication of said normal outlet and drain connections when said valve means is in its flushing position, said valve means also including a flow responsive member in the flow path between said normal outlet and drain connections operatively connected to said valve means and adapted to move said valve means from said normal position to said flushing position in response to the flow of fluid through said drain connection.

2. A flushing valve for liquid treatment plants, comprising: a valve casing having a bore therein, an inlet port opening to said bore intermediate the ends thereof, a flushing outlet port leading from one end portion of said bore, a drain outlet port leading from said bore from a point toward but axially spaced from the other end thereof, and a normal outlet port communicating with said bore between said inlet port and said drain outlet port; and a valve assembly movable in said bore through a working stroke between a normal limiting position shifted toward said one end of said bore and a flushing position shifted toward said other end of said bore, said valve assembly comprising: a plunger body in said bore located between said inlet port and said flushing outlet port when said valve assembly is in said normal position, said plunger body being shaped and dimensioned relative to said bore to afford a fluid passageway between it and the walls of said bore, a valve element carried with said plunger body closing said flushing outlet port when said assembly is in said normal position, a piston valve loosely slidably fitted in said bore, a valve stem connecting said piston valve to said plunger body, said piston being positioned by said stem between said normal outlet port and said drain outlet port when said valve assembly is in said normal position, and between said drain outlet port and said other end of said bore when said valve assembly has been shifted through said working stroke to said flushing position, and a sealing element on said valve assembly for forming a sealed closure in said bore between said inlet port and said normal outlet port, said sealing element occupying a position on the side of the inlet port opposite to said normal outlet port when said valve assembly is in said normal position, and being movable, with travel of said valve assembly to said flushing position, past said inlet port to said bore sealing position between said inlet port and said normal outlet port, all in such manner that in said normal position, water entering through said inlet port is discharged via said normal outlet, said flushing outlet port is closed by said valve element carried by said plunger body, and said piston valve blocks flow from said inlet port to said drain outlet port, and in said flushing position, water entering through said inlet port is blocked by said sealing element from flow in said bore to said normal outlet port, and said water flows instead past said plunger body and valve element carried thereby and is discharged through said flushing outlet port, and flushing water entering through said normal outlet port passes through said bore and is discharged from said drain outlet port.

3. The subject matter of claim 2, wherein said sealing element is so positioned axially of said valve assembly relative to said piston valve as to at least partially choke the flow path in said bore from said inlet port toward said normal and drain outlet ports when said piston valve has partially opened said drain outlet port, whereby to create a pressure differential across said sealing element effective to assure completion of the movement of said valve assembly to said flushing position wherein said piston valve is in a position fully opening said flushing port.

4. A flushing valve for liquid treatment plants, comprising: a vertically elongated valve casing having a vertical longitudinal fluid passage therein, a line pressure inlet port opening to said passage intermediate the ends thereof, a flushing outlet port leading from the lower end portion of said passage, a drain outlet port leading from the upper end portion of said passage, and a normal outlet port communicating with said passage between said inlet port and said drain outlet port; and a valve assembly movable vertically in said passageway through a working stroke between a normal lowermost limiting position and an upper flushing position, said valve assembly comprising: a weighted plunger body in said passageway of lesser cross-sectional area than the portion of said passageway therearound, whereby to permit liquid flow in said passageway past said body, means on said plunger body blocking said flushing outlet port when said assembly is in said normal lowermost position, the weight of said plunger body causing said valve assembly normally to settle by gravity to said lowermost position, a sealing element on said valve assembly for forming a sealed closure in the portion of said passageway between said inlet port and said normal outlet port, said sealing element occupying a position permitting flow from said inlet port upwardly in said passageway to said normal outlet port when said valve assembly is in said lowermost position, and being movable, with travel of said valve assembly to said flushing position, to an elevated position sealing said portion of said passageway between said inlet port and said normal outlet port, a piston having a working stroke in a portion of said passageway above said normal outlet port, and a stem connecting said piston to said plunger body, said piston being positioned by said stem in a lowermost position above said normal outlet port and below said drain outlet port when said valve assembly is in said normal lowermost position, said piston being dimensioned relative to the portion of said passageway therearound so as to block liquid flow therepast toward said drain outlet port when in said lowermost position, and being movable upwardly by line pressure therebelow from its said lowermost position through said working stroke to an elevated position unblocking flow through said passage to said drain outlet port when back pressure is relieved at said drain outlet port, said stem when so elevated through said working stroke positively elevating said plunger body to unblock flow through said flushing outlet port and positively elevating said sealing means to seal said passageway between said inlet and normal outlet ports.

5. The subject matter of claim 4, including an annular valve seat in said passageway between said inlet and normal outlet ports, and wherein said sealing element engages said valve seat in said flushing position of said valve assembly to form said sealed closure in said passageway.

6. The subject matter of claim 4, wherein said sealing element comprises a cup leather slideable in said passageway.

References Cited in the file of this patent

UNITED STATES PATENTS

| | | |
|---|---|---|
| 207,615 | McElory | Sept. 3, 1878 |
| 1,976,439 | Dotterwich | Oct. 9, 1934 |
| 2,396,809 | Addison | Mar. 19, 1946 |
| 2,539,748 | Mueller | Jan. 30, 1951 |
| 2,670,328 | Webb | Feb. 23, 1954 |
| 2,715,098 | Whitlock | Aug. 9, 1955 |
| 2,751,347 | Miller | June 19, 1956 |